United States Patent [19]
LeGrand et al.

[11] 3,712,718
[45] Jan. 23, 1973

[54] CORNEAL CONTACT LENS

[76] Inventors: Joseph A. LeGrand, 16 Arrowhead Trail, Media, Pa. 19063; Ari Fuhrman, 6624 Rutland Street, Philadelphia, Pa. 19306

[22] Filed: Oct. 23, 1970

[21] Appl. No.: 83,453

[52] U.S. Cl. ..................................351/160, 351/162
[51] Int. Cl. .................................................G02c 7/04
[58] Field of Search ..............351/160, 162; 43/1, 13

[56] References Cited

UNITED STATES PATENTS

| 3,454,332 | 7/1969 | Siegel | 351/162 |
| 2,593,150 | 4/1952 | Jardon | 351/160 X |
| 2,673,369 | 3/1954 | Galeski | 351/160 X |
| 3,034,403 | 5/1962 | Neefe | 351/162 |
| 3,536,386 | 10/1970 | Spivack | 351/160 |

FOREIGN PATENTS OR APPLICATIONS 1,115,140  12/1955  France ..............................351/160

OTHER PUBLICATIONS

Soehnges, Article in Contacto Vol. 12 No. 1 March, 1968 pgs. 56–59 cited

*Primary Examiner*—David H. Rubin
*Attorney*—Edward A. Sager

[57] ABSTRACT

A corneal contact lens having a transparent central zone is provided with an irregular pattern of colored striations in the surrounding peripheral zone in order to highlight the natural color of the wearer's iris, without requiring a lens large enough to cover the entire iris. Transparent regions about the striations extend the optical area into the peripheral zone so that central vision is not restricted and peripheral vision is improved.

7 Claims, 5 Drawing Figures

PATENTED JAN 23 1973
3,712,718
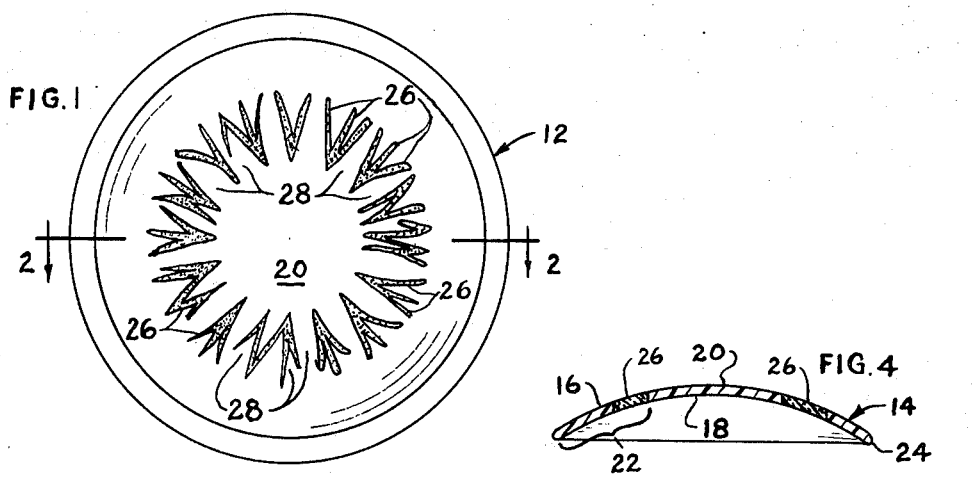
FIG.1
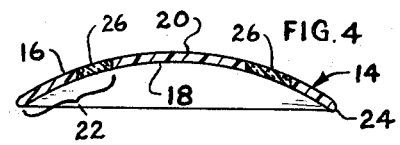
FIG.4
FIG.2
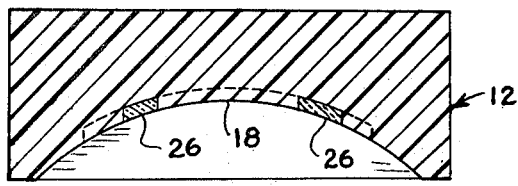
FIG.5
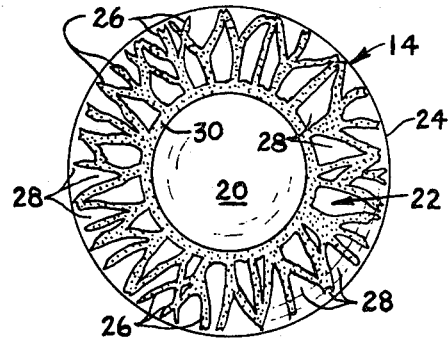
FIG.3
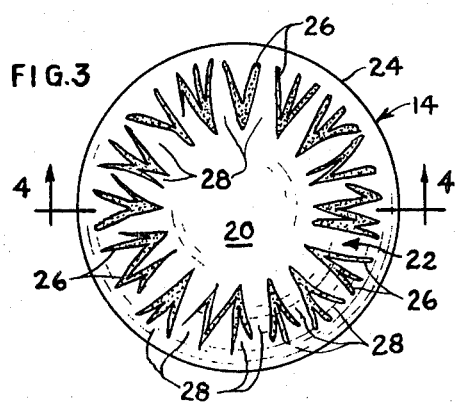
INVENTORS
JOSEPH A. LeGRAND
&
ARI FUHRMAN

CORNEAL CONTACT LENS

This invention relates to corneal contact lenses of plastic material, and more particularly to those of the type adapted for cosmetic use as well as for correction of vision.

Fully transparent contact lenses intended only for correction of vision may be made with a lens diameter of 8 to 10 millimeters in order to cover a dilated pupil. However, conventional cosmetic lenses retained on the cornea have been made larger, usually in the range of 10.5 to 12 millimeters, in order to provide a colored peripheral zone or iris portion which fully covers the wearer's iris. The greater size and weight of conventional cosmetic lenses is disadvantageous.

Cosmetic contact lenses also require a central optical zone or pupil portion of about 4 to 5 millimeters in diameter which is made transparent for visual transmission. This central zone provides optical correction when the outer surface of the lens is ground and polished to prescribed curvature, taking into account the curvature of the inner surface of the lens which is fitted to the wearer's cornea. With a circular central zone of fixed diameter found on conventional lenses of this type, as well as the peripheral colored area of low light transmissivity, the wearer experiences some visual obscurity when his pupils dilate to accommodate for reduced illumination.

The present invention is directed to overcoming the aforementioned disadvantages of conventional lenses and to gaining a number of advantages thereover.

According to the present invention, a corneal contact lens, 8 to 10 millimeters in diameter and having a transparent central zone, is provided with an irregular pattern of colored striations in the surrounding peripheral zone. Transparent regions about the striations extend the optical zone to provide a wider visual field than is obtainable with lenses having a fully colored peripheral zone. The striations extend for the full thickness of the lens, and therefore the striations will appear in the lens after final grinding as they do in the lens blank, without retouching or further processing to obtain the desired cosmetic result.

The striations serve to accentuate or highlight the wearer's iris rather than to cover it completely with an entirely new color. This approach obtains a desirable cosmetic advantage with a lens of small diameter, so that the disadvantage of increased size and weight is avoided.

A lens made according to the invention is free of laminations and voids. The striations providing color are surrounded by transparent regions which together with the transparent central zone consist of a single homogeneous phase of acrylic polymer material bonded to the material comprising the striations. The resultant lens is a unitary body having structural integrity which is rugged and dependable, and which lends itself to convenient manufacture.

In the drawings:

FIG. 1 is a plan view of a lens blank, showing the concave side thereof;

FIG. 2 is a transverse sectional view of the blank of FIG. 1, taken on the line 2 — 2 thereof, with the concave side facing downwardly;

FIG. 3 is a plan view of a corneal contact lens made according to the invention and showing the convex side thereof;

FIG. 4 is a transverse sectional of the corneal contact lens of FIG. 3, taken on the line 4 — 4 of FIG. 3; and FIG. 5 is a view similar to FIG. 3, but showing a modified form of corneal contact lens made according to the invention.

Referring to the drawings in greater detail, the finished lens 14 of FIGS. 3 and 4 or FIG. 5 is made by removal of material from the blank or "button" 12 of FIGS. 1 and 2.

The finished lens 14 is concavo-convex in cross section, appearing as a circular segment of a thin-walled hollow sphere. The lens 14 has a continuously convex outer face 16, the surface of which may be formed about an imaginary point and at a constant radius therefrom. In addition, the lens 14 has a continuously concave inner face 18, the surface of which may also be formed with all portions at like radial distances from an imaginary point. The last-mentioned imaginary point may be some distance from the other imaginary point. The outer face 16 and the inner face 18 are separated by the thickness of the lens 14.

The lens 14 described herein is made from plastic material of optical quality; and although the invention is not so limited polymethyl methacrylate or any other suitable acrylic polymer material is preferred. The button 12 is a single homogeneous phase of such material, preferably ½ inch in diameter and 3/16 inch thick, before any cuts or additions are made thereon.

As shown in FIG. 3, the lens 14 has an outside diameter which is approximately in the range of between 8 and 10 millimeters, substantially the same as is preferred for corneal contact lenses which are not used for cosmetic purposes and are entirely clear. The lens 14 has a clear or transparent central zone 20 covering an area having a diameter from 4 to 5 millimeters. The central zone 20 is centered within an annular peripheral zone 22 bounded on the outside by the edge 24 of the lens and on the inside by the central zone. A distinct border between the zones 20 and 22 does not appear in the lens 14 of FIG. 3 as it does in the lens of FIG. 5. When worn, the central zone 20 covers the wearer's pupil and the peripheral zone 22 overlies the wearer's iris or portion thereof; and therefore the central zone 20 is an optical zone through which visual transmissions are made to the eye, while the peripheral zone 22 contains the colored matter used to gain a cosmetic advantage.

The peripheral zone 22 comprises an annular array of colored striations 26 and transparent regions 28, the striations being of substantially uniform composition for the thickness of the lens. The striations 26 have substantially less light transmissivity than the central zone 20 and the transparent regions 28. As best seen in FIG. 3, the striations 26 are linear and curvilinear stripes extending in generally radial direction, some appearing like arrowheads, mostly in groups of several of them which contact one another and converge in the direction of the central zone 20. The inner and outer ends of the radially extending striations 26 define an irregular pattern.

The transparent regions 28 of the peripheral zone 22 are disposed between at least portions of neighboring striations 26, and also between at least portions of the striations and the edge 24 of the lens 14. In the case of the lens 14 shown in FIG. 3 the transparent regions 28 are contiguous to the transparent central zone 20, thus providing an outer extension of the central zone which widens the wearer's field of vision and makes him unaware of the striations 26 adjacent the optical zone of the lens. This is an advantage over cosmetic lenses having peripheral zones which restrict the field of vision, as with opaque or nearly opaque coloring material over this entire portion of the lens.

For applications where a more distinct peripheral zone 22 is required or preferred, the lens 14 of FIG. 5 may be employed. It is characterized by a circular striation 30 which is formed about the central zone 20 and is adjacent thereto. The circular striation 30 connects the groups of striations 26 at the ends thereof near the central zone 20. Although this form of the invention does not have transparent regions 28 contiguous to the central zone 20, it does have such regions 28 in the peripheral zone 22.

Whether the lens of FIG. 5 or FIG. 3 is employed for cosmetic reasons, it is a feature of the present invention that the transparent regions 28 permit the wearer's iris to be the base color while the striations 26 provide highlighting or contrasting color. Yet this is accomplished with a lens of small diameter.

The lens 14 is made by first cutting the inner face 18 to the desired concave shape in a piece of plastic material of the type described. Then the striations 26 are cut or formed in the concave face 18 in any suitable manner to a depth of at least 0.15 millimeter, and the cuts are filled. The filling material preferably comprises acrylic powder mixed with a liquid containing an acrylic monomer, such as methyl methacrylate, which polymerizes with the aid of a catalyst in the powder, and also translucent coloring matter. The latter is preferably a natural or earth pigment, although any stable, non-toxic, non-irritating material may be considered for use as coloring matter. For a further discussion of materials in general use for making contact lenses of this type, reference is made to U.S. Pat. No. 3,454,332 which was granted July 8, 1969 to Robert Siegel.

With the filling material in plastic condition it is packed into the cuts to fill them, and then the button 12 is heated to cure the filling material, preferably at 212° F. After curing the striation material will be found bonded to the transparent material around it, thus forming an integral, unitary body therewith. It is an advantage of the present invention that the lens blank 12 is made without laminations, and it is free of objectionable voids by which the lens of U.S. Pat. No. 3,454,332 is characterized in that specification and the appended claims. By thorough mixing of the filling material and careful packing of the cuts, the striations 26 are of uniform composition for the thickness of the lens. Due to the presence of the coloring matter the striations have substantially less light transmissivity than the transparent regions 28 and the central zone 20. If the coloring matter is a metallic or reflective pigment, the striations 26 highlight the wearer's iris in an unusual manner.

The lens 14 shown in FIG. 3 is made from the button 12 of FIGS. 1 and 2 by cutting away the material above the concave surface 18 to a lens thickness of about 0.15 millimeters, thereby forming the outer or convex face 16 of the lens. Since the striations are made to at least this depth, they extend from one face to the other for the full thickness of the finished lens 14. The edge 24 of the lens 14 is also rounded to a very small radius. All surfaces are smoothly polished.

The finished lens 14 is ground and polished to provide the optical characteristics prescribed for the wearer. This is usually done to the outer or convex face 16 only, providing a continuously convex face of constant radius. Although a plano lens is shown in FIG. 4, a finished lens 14 most frequently possesses non-uniform thickness. It is to be appreciated that even with a lens of non-uniform thickness the striations 26 provide uniform highlighting, since the striations extend for the thickness of the lens. It is therefore possible to produce a lens to the prescribed optical curvature and with coloration on the outer face 16 simultaneously with the final grinding and polishing steps of the lens making process. There is no need for further attention by a specialist in lens coloring after the lens is made to optical specifications.

It is especially advantageous that the lens 14 produces a highly satisfactory cosmetic effect even though the lens is smaller than the wearer's iris. In addition, the lens of the present invention provides a wider field of vision than has been possible heretofore with other known lenses of this general type.

What is claimed is:

1. A corneal contact lens of generally concavo-convex cross section and having the approximate shape of a circular segment of a thin-walled hollow sphere, said lens having a continuously convex outer face and a continuously concave inner face, said faces being separated by the thickness of the lens, said lens having an annular peripheral zone bounded by the edge of said lens and having a central zone substantially centered in said peripheral zone, the outside diameter of the annular peripheral zone being approximately in the range of between 8 and 10 millimeters and the diameter of the central zone being approximately in the range of between 4 and 5 millimeters, the central zone being substantially transparent, the peripheral zone comprising an annular array of colored striations and substantially transparent regions, said transparent regions being disposed in annular formation between at least portions of neighboring striations and between at least portions of said striations and the edge of said lens; said central zone and said transparent regions consisting of a single homogeneous phase of material of optical quality, said striations being of substantially uniform composition for the thickness of the lens and having light transmissivity substantially smaller than the light transmissivity of said central zone and said transparent regions, said striations being bonded to said central zone and said transparent regions and forming therewith an integral, unitary body, whereby said transparent regions extend the optical zone of said lens from said central zone to the edge of said lens.

2. A corneal contact lens according to claim 1 wherein said material consists mainly of acrylic polymer material.

3. A corneal contact lens according to claim 2 wherein the composition of said striations is essentially a mixture of acrylic polymer material and translucent coloring matter.

4. A corneal contact lens according to claim 1 wherein the striations are divided mostly into groups of several of them which are in contact with one another and converge in the general direction of said central zone.

5. A corneal contact lens according to claim 4 wherein the ends of the striations closest to the edge of the lens define an irregular pattern.

6. A corneal contact lens according to claim 5 wherein the ends of the striations closest to the central zone define an irregular pattern.

7. A corneal contact lens according to claim 5 wherein the striations include a circular striation formed about, and adjacent to, said central zone; said circular striation connecting the groups of striations at the ends thereof closest to said central zone.

* * * * *